(12) United States Patent
Osaki et al.

(10) Patent No.: US 8,763,943 B2
(45) Date of Patent: Jul. 1, 2014

(54) WEBBING TAKE-UP DEVICE

(75) Inventors: Takahiro Osaki, Aichi-ken (JP); Shinji Mori, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 541 days.

(21) Appl. No.: 13/018,752

(22) Filed: Feb. 1, 2011

(65) Prior Publication Data

US 2011/0186676 A1    Aug. 4, 2011

(30) Foreign Application Priority Data

Feb. 3, 2010    (JP) ................................. 2010-022447

(51) Int. Cl.
  *B65H 75/48*    (2006.01)
(52) U.S. Cl.
  USPC ...... 242/372; 242/375; 242/375.1; 242/375.2
(58) Field of Classification Search
  USPC ................. 242/372, 375, 375.1–375.3, 394.1
  See application file for complete search history.

(56) References Cited

U.S. PATENT DOCUMENTS

| | | | | | |
|---|---|---|---|---|---|
| 4,913,372 | A | * | 4/1990 | Takada | 242/372 |
| 4,993,657 | A | * | 2/1991 | Brown | 242/372 |
| 5,553,802 | A | * | 9/1996 | Park et al. | 242/372 |
| 6,149,093 | A | * | 11/2000 | Kwag | 242/372 |
| 6,431,485 | B2 | * | 8/2002 | Mitsuo et al. | 242/372 |
| 2011/0186675 | A1 | * | 8/2011 | Osaki et al. | 242/372 |

FOREIGN PATENT DOCUMENTS

| | | |
|---|---|---|
| JP | 2003019946 A | 1/2003 |
| JP | 3396027 B2 | 4/2003 |
| JP | 2006290343 A | 10/2006 |

* cited by examiner

*Primary Examiner* — Sang Kim
(74) *Attorney, Agent, or Firm* — Roberts Mlotkowski Safran & Cole, P.C.

(57) ABSTRACT

A webbing take-up device which can improve the workability of the assembly work of a tension reducer is obtained. In this webbing take-up device, a take-up spring unit is arranged closer to the opening side of a case than a reduction spring unit within a case. For this reason, when a clutch is arranged inside the reduction balance spring and the inner end of the reduction balance spring in a spiral direction is locked to a spring case of the clutch, the clutch and the reduction balance spring can be easily and visually recognized from the opening side of the case. Thus, the other end of the reduction balance spring can be easily locked to the spring case.

2 Claims, 5 Drawing Sheets

WEBBING TAKE-UP DEVICE

CROSS-REFERENCE TO RELATED APPLICATION

This application claims priority under 35 USC 119 from Japanese Patent Application No. 2010-022447 filed Feb. 3, 2010, the disclosure of which is incorporated by reference herein.

BACKGROUND

1. Technical Field

The present invention relates to a webbing take-up device including a tension reducer which can make a biasing force biasing a webbing belt in a take-up direction to be small in a state in which the webbing belt which constrains an occupant's body is worn.

2. Related Art

In a webbing take-up device disclosed in Japanese Patent No. 3,396,027, a winding shaft connected to one end of a seat belt take-up shaft is rotatably supported by a housing. The end of a main power spring, which generates a biasing force in a direction (take-up direction) in which a seat belt is taken up around the seat belt take-up shaft as the seat belt is pulled out from the seat belt take-up shaft, is locked to this winding shaft, and a ratchet wheel which constitutes a so-called tension reducer is rotatably supported.

In the tension reducer applied to this webbing take-up device, the inner end of a subsidiary power spring in the spiral direction of which the outer end in the spiral direction is locked to a ratchet wheel engages frictionally with the winding shaft via a ring or a spring clutch.

When the main power spring rotates the winding shaft in the take-up direction in a state in which a ratchet claw of a rotation regulating mechanism has regulated the rotation of the ratchet wheel in the take-up direction, the inner end of the subsidiary power spring in the spiral direction rotates in the take-up direction with respect to the outer end in the spiral direction in a state in which the rotation in the take-up direction has been regulated via the ratchet wheel. Thereby, the biasing force of the main power spring is offset by the biasing force generated in the subsidiary power spring.

In the tension reducer applied to this webbing take-up device, the inner end of the main power spring in the spiral direction is locked to the winding shaft which has passed through the ratchet wheel. However, when the inner end of the main power spring in the spiral direction within a case member is locked to the winding shaft which has passed through the ratchet wheel, the inner end of the main power spring in the spiral direction is hidden by the ratchet wheel or the case member, and thus, it is difficult to operate.

SUMMARY

The invention provides a webbing take-up device which can improve the workability of the assembly work of a tension reducer in consideration of the above facts.

A webbing take-up device of a first aspect of the invention is a webbing take-up device including a spool having a longitudinal base end of a long belt-shaped webbing belt locked thereto, taking up the webbing belt from the base end, and rotating in a pull-out direction as the webbing belt is pulled out; a bottomed case provided at an axial direction side of the spool and opening toward the spool; a spool biasing member provided inside the case and connected directly or indirectly to the spool so as to generate a take-up biasing force to the spool in a take-up direction opposite to the pull-out direction as the spool rotates in the pull-out direction; a rotating body arranged within the case on the opposite side of the spool biasing member from the spool and rotatable in the pull-out direction and the take-up direction; an offset biasing member arranged within the case on the opposite side of the spool biasing member from the spool along with the rotating body, one end of the offset biasing member engaging with the rotating body so as to be rotatable along with the rotating body, and the offset biasing member producing an offset biasing force which resists the take-up biasing force of the spool biasing member due to another end of the offset biasing member rotating in the take-up direction with respect to the one end of the offset biasing member; and a rotation transmission member connected to the spool biasing member, and provided so as to be rotatable in the take-up direction by the take-up biasing force of the spool biasing member, the other end of the offset biasing member locked to the rotation transmission member such that the rotation in the take-up direction can be transmitted to the other end of the offset biasing member.

In the webbing take-up device of the first aspect of the invention, the spool rotates in the pull-out direction when an occupant of a vehicle pulls out the webbing belt from the spool. When the spool rotates in the pull-out direction in this way, a take-up biasing force is generated by the spool biasing member, and the spool is biased in the take-up direction opposite to the pull-out direction.

When the occupant ends the pulling of the webbing belt in a state in which the webbing belt pulled out from the spool is hung around the occupant's body, the biasing force of the spool biasing member rotates the spool in the take-up direction, thereby taking up the webbing belt around the spool to remove the slack from the webbing belt. Additionally, the take-up biasing force of the spool biasing member can be transmitted to the other end of the offset biasing member via the rotation transmission member as a rotational force in the take-up direction.

When the rotational force in the take-up direction based on the take-up biasing force of the spool biasing member is transmitted to the other end of the offset biasing member and the other end of the offset biasing member rotates in the take-up direction, the one end of the offset biasing member attempts to rotate the rotating body. When the rotation of the rotating body in the take-up direction is regulated in this state, the rotation of one end of the offset biasing member in the take-up direction is regulated or suppressed, and thereby, the other end of the offset biasing member rotates in the take-up direction relative to the one end. When the other end of the offset biasing member rotates in the take-up direction relative to the one end, an offset biasing force in the pull-out direction is generated in the offset biasing member.

Since the offset biasing force of the offset biasing member biases the other end of the offset biasing member in the pull-out direction, the offset biasing member biases the rotation transmission member and thus the spool in the pull-out direction, and resists the take-up biasing force generated in the spool biasing member. For this reason, the take-up biasing force of the spool biasing member is offset by the offset biasing force of the offset biasing member, and the force which biases the spool in the take-up direction decreases. As the force which biases the spool in the take-up direction decreases in this way, the force which pulls the webbing belt toward the base end decreases, and the force with which the webbing belt worn on an occupant's body fastens the occupant's body decreases.

Meanwhile, in the webbing take-up device related to the invention, since the rotating body and the offset biasing member are provided on the side opposite (i.e., the side opposite to the opening direction of the case) to the spool via the spool biasing member, the rotating body and the offset biasing member is arranged within the case earlier than the spool biasing member. When the rotation transmission member is assembled at the other end of the offset biasing member arranged in the case in this way, since the offset biasing member can be easily and visually recognized from the opening side of the case, assembling the rotation transmission member to the other end of the offset biasing member is easy.

Accordingly, if the spool biasing member is connected to the rotation transmission member attached to the other end of the offset biasing member, a so-called "tension reducer" which easily offsets the take-up biasing force of the spool biasing member by the offset biasing force of the offset biasing member and reduces the tension of the webbing belt can be easily assembled.

A webbing take-up device of a second aspect of the invention is the webbing take-up device according to the first aspect of the invention in which the offset biasing member is configured to be arranged inside the rotating body, the rotating body is configured to be attached to the case in a state in which the offset biasing member is arranged inside the rotating body and the rotating body and the offset biasing member are configured as a unit, the spool biasing member is held by a holding body that holds the spool biasing member and is configured as a unit therewith, and the holding body is configured to be attached to the case in a state in which the spool biasing member is held by the holding body.

In the webbing take-up device of the second aspect of the invention, the offset biasing member can be arranged inside the rotating body. In this way, the offset biasing member can be arranged inside the rotating body and configured as a unit. Moreover, the rotating body can be attached to the case in the state in which the offset biasing member is arranged inside the rotating body and configured as a unit. On the other hand, the spool biasing member can be configured as a unit by being held by the holding body. In a state in which the spool biasing member is held by the holding means in this way, a connecting member can be attached to the spool biasing member, and the connecting member is attached (supported by) to the case. Thereby, improved assembly efficiency can be achieved by assembling the unit on the side of the rotating body and the offset biasing member and the unit on the side of the spool biasing member and the connecting means in advance in separate steps, and attaching the respective units to the case in order.

BRIEF DESCRIPTION OF THE DRAWINGS

Exemplary embodiments of the present invention will be described in detail based on the following figures, wherein.

DETAILED DESCRIPTION

Configuration of Present Embodiment

Figure 1:
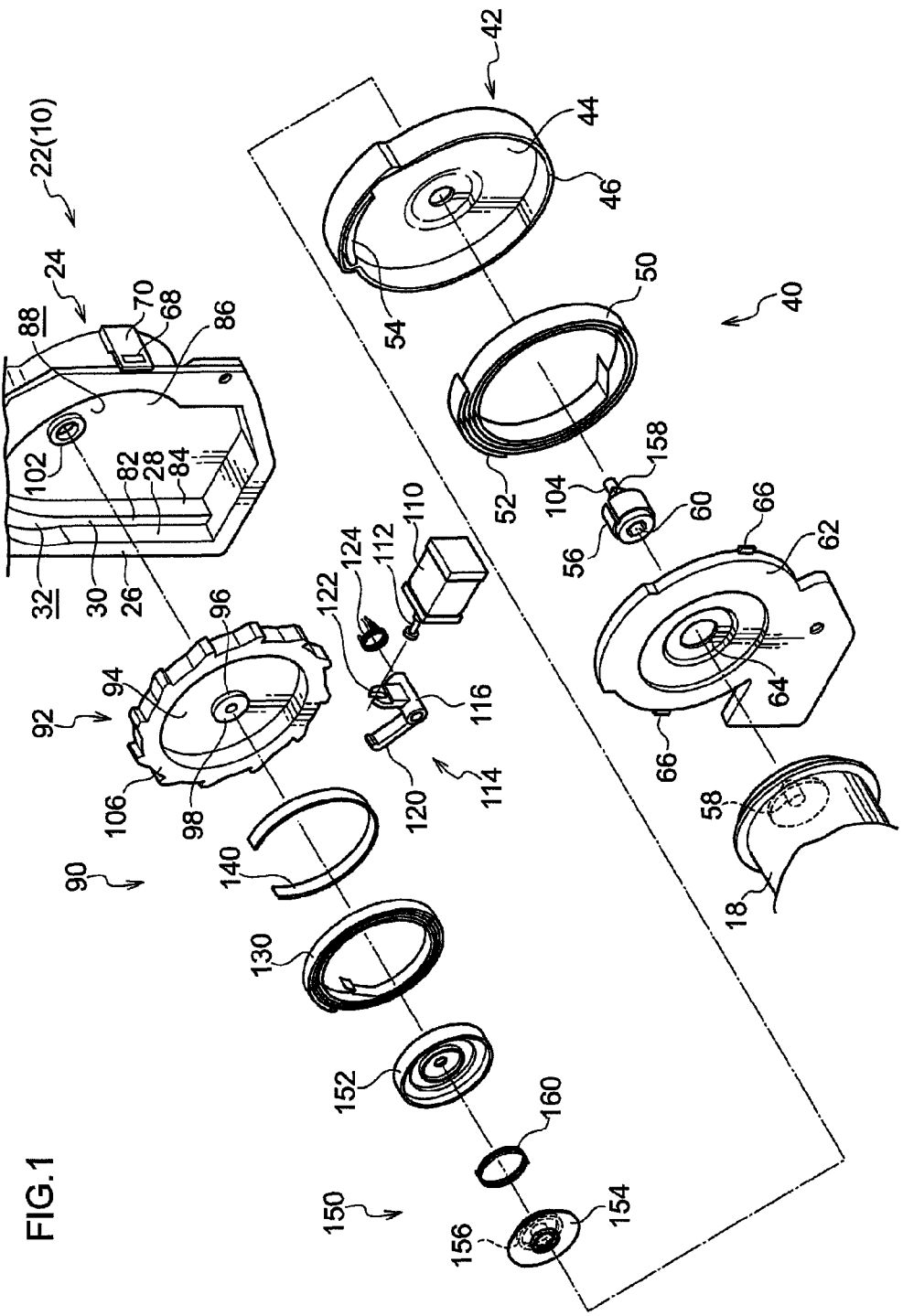
FIG. 1 is an exploded perspective view of chief parts of a webbing take-up device related to one embodiment of the invention.
Figure 2:
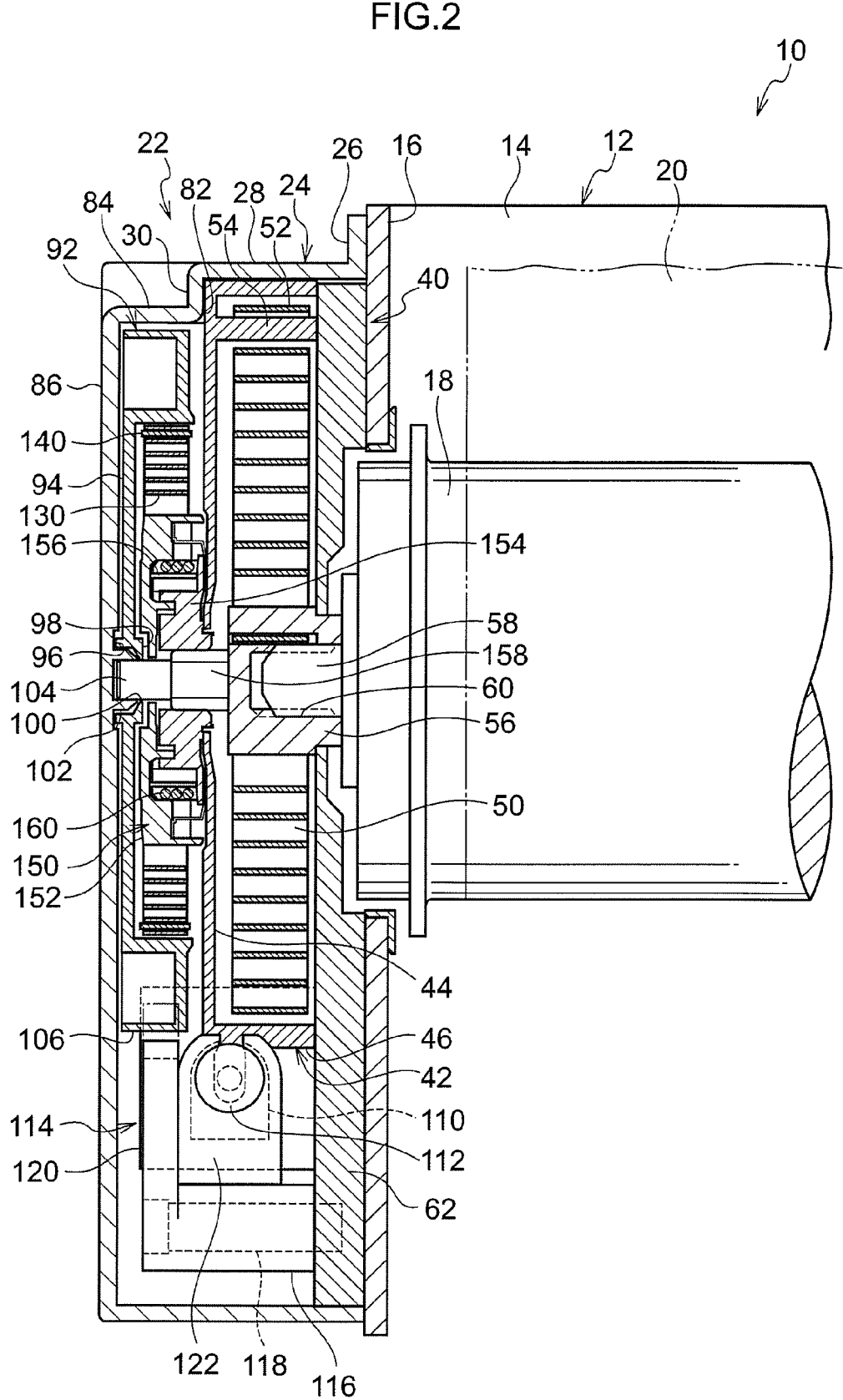
FIG. 2 is a front sectional view of the chief parts of the webbing take-up device related to one embodiment of the invention.

The configuration of chief parts of a webbing take-up device 10 related to one embodiment of the invention is shown by an exploded perspective view in FIG. 1, and the configuration of the chief parts of the webbing take-up device 10 is shown by a front sectional view in FIG. 2.

As shown in FIG. 2, the webbing take-up device 10 includes a frame 12. The frame 12 includes a back plate 14. A leg plate 16 extends toward one side of the back plate 14 in its thickness direction from one end of the back plate 14 in its width direction, and a leg plate (not shown) extends toward an extending direction of the leg plate 16 with respect to the back plate 14 from the other end of the back plate 14 in the width direction. A spool 18 is provided between the leg plate 16 extending from one end of the back plate 14 in the width direction and the leg plate (not shown) extending from the other end of the back plate 14 in the width direction. As shown in FIG. 1, the spool 18 is formed in a cylindrical shape of which the axial direction runs along the width direction of the back plate 14.

A longitudinal base end of the webbing belt 20 which is formed in a long belt shape is locked to the spool 18. When the spool 18 rotates in the take-up direction which is one side around the axis thereof, the webbing belt 20 is taken up around the outer peripheral portion of the spool 18 from the longitudinal base end. On the other hand, when the webbing belt 20 is pulled toward its tip, the webbing take-up device 10 rotates in a pull-out direction opposite to the take-up direction while the webbing belt 20 taken up around the spool 18 is pulled out from the spool 18.

Meanwhile, a case 24 which constitutes a tension reducer 22 is provided outside the leg plate 16 along the width direction of the back plate 14. The case 24 includes a plate-shaped base 26 of which the thickness direction runs along the thickness direction of the leg plate 16, and the base 26 is fixed to the leg plate 16 by a tightening and fixing means, such as a screw, or a fitting and fixing means, such a baluster pin. The base 26 is formed with a hole of a predetermined shape, and an annular peripheral wall 28 along the edge of this hole is formed toward the side of the base 26 opposite to the leg plate 16. A middle wall 30 is formed at the end of the peripheral wall 28 opposite to the base 26 continuously from the peripheral wall 28. The middle wall 30 is formed in the shape of a plate of which the thickness direction runs along the thickness direction of the base 26, and the space surrounded by the peripheral wall 28 on the side closer to the base 26 than the middle wall 30 is used as a take-up spring unit housing portion 32 (refer to FIG. 1).

The take-up spring unit 40 is arranged inside the take-up spring unit housing portion 32. The take-up spring unit 40 includes a spring cover 42 serving as a holding body. The spring cover 42 includes a plate-shaped bottom wall 44. A peripheral wall 46 is erected toward the leg plate 16 from the outer peripheral portion of the bottom wall 44, and the spring cover 42 is formed in the shape of a box which opens toward the leg plate 16 as a whole. The outer peripheral shape of the spring cover 42 is slightly smaller than the inner peripheral shape (i.e., the inner peripheral shape of the peripheral wall 28) of the take-up spring unit housing portion 32, and the spring cover 42 is fitted in a state in which the rotation of the spring cover with respect to the case 24 is prevented inside the take-up spring unit housing portion 32.

A take-up spring 50 serving as a spool biasing member is provided inside the spring cover 42. The take-up spring 50 is constituted by a power spring in which the direction to the inside in a spiral direction from the outside in the spiral direction becomes the pull-out direction. A locking portion 52 is formed near the outer end of the take-up spring 50 in the spiral direction such that the take-up spring 50 is folded back in an opposite direction, and is locked to a locking wall 54 erected toward the leg plate 16 from the bottom wall 44. On the other hand, the inner end of the take-up spring 50 in the spiral direction is locked to the outer peripheral portion of an adapter 56 which constitutes a rotation transmission member serving as a connecting member.

The adapter 56 is formed in a columnar shape made substantially coaxially with the spool 18. The end of the adapter 56 which faces the axial end of the spool 18 on the leg plate 16 side is formed with a fitting hole 60 into which a connecting shaft portion 58 formed to protrude from the spool 18 coaxially with the spool 18 fits. As the connecting shaft portion 58 fits into the fitting hole 60, the spool 18 and the adapter 56 are connected together in a state in which the adapter 56 cannot rotate relative to the spool 18.

For this reason, when the webbing belt 20 is pulled toward its tip and the spool 18 is rotated in the pull-out direction, the inner end of the take-up spring 50 in the spiral direction rotates relatively in the pull-out direction with respect to the outer end in the spiral direction. As the take-up spring 50 is wound and tightened in this way, the spool 18 is biased in the take-up direction, and as the rotational amount in the pull-out direction of the inner end of the take-up spring 50 in the spiral direction relative to the outer end of the take-up spring 50 in the spiral direction becomes larger, the biasing force is increased.

A sheet 62 is provided on the opening side of the spring cover 42 in which the take-up spring 50 is housed. The sheet 62 is formed in the shape of a plate of which the thickness direction runs along the thickness direction of the leg plate 16. The sheet 62 is formed with a through hole 64 through which the adapter 56 passes. Additionally, fitting pieces 66 extend from a portion of the outer periphery of the sheet 62. Fitting portions 70 each having a fitting hole 68 are formed on the above back plate 14 so as to correspond to the fitting pieces 66. By fitting the fitting pieces 66 into the fitting holes 68 of the fitting portions 70, the sheet 62 is integrally attached to the back plate 14, and the opening side of the take-up spring unit housing portion 32 in a back plate 14 and the opening side of the spring cover 42 are closed.

Meanwhile, the middle wall 30 of the back plate 14 is formed with a hole portion 82 of a predetermined shape. Moreover, a peripheral wall 84 along the edge of the hole portion 82 is formed on the face of the middle wall 30 opposite to the leg plate 16. The end of the peripheral wall 84 opposite to the middle wall 30 is closed by a bottom wall 86, the inside of the peripheral wall 84 closer to the middle wall 30 than the bottom wall 86 is used as a reduction spring unit housing portion 88, and the reduction spring unit 90 is housed in the reduction spring unit housing portion 88. The reduction spring unit 90 includes a ratchet gear 92 serving as a rotating body.

The ratchet gear 92 includes a plate-shaped bottom wall portion 94 of which the thickness direction runs along the thickness direction of the bottom wall 86. A boss 96 is formed at the center of the bottom wall portion 94. The boss 96 is formed in the shape of a bottomed cylinder which opens toward the bottom wall 86. The portion of the boss 96 closer to one side (the opening side of the boss 96) than an axial intermediate portion of the boss protrudes to the bottom wall 86 side of the bottom wall portion 94, and the portion of the boss 96 closer to the other side (the bottom 98 side of the boss 96) than the axial intermediate portion of the boss protrudes to the leg plate 16 side of the bottom wall portion 94.

The inner peripheral shape of the boss 96 is formed in a circular shape which is coaxial with the circular outer peripheral shape. Moreover, the bottom 98 is formed with a through hole 100 which is coaxial with the inner peripheral shape of the boss 96. The through hole 100 not only passes through the bottom 98, but also is formed in the shape of a circular truncated cone of which the internal diameter dimension becomes gradually smaller toward an opening end of the bottom 98 in the face on the side of the leg plate 16.

As shown in FIGS. 1 and 2, a bearing 102 which constitutes both a first supporting means and a second supporting means serving as circular bodies is formed at the bottom wall 86 of the case 24 so as to correspond to the boss 96. The bearing 102 is formed in the shape of a cylinder which is coaxial with the spool 18 in a state in which the case 24 is attached to the leg plate 16. However, the tip side of the bearing 102 is formed in the shape of a circular truncated cone of which the external diameter dimension becomes gradually smaller toward the tip so as to correspond to the through hole 100 formed in the bottom 98 of the boss 96. The boss 96 enters the outside of the bearing 102 in a state in which the ratchet gear 92 is arranged within the reduction spring unit housing portion 88, and the ratchet gear 92 is rotatably supported by the boss 96. Moreover, a shaft portion 104 which is formed integrally with the adapter 56 formed in a columnar shape coaxially with the spool 18 enters the inside of the boss 96, and the shaft portion 104 (i.e., the adapter 56) is rotatably supported.

The outer peripheral portion of the bottom wall portion 94 is formed with a ratchet portion 106, and the ratchet gear 92 is formed in the shape of a tray (a bottomed tube of which the axial dimension is comparatively short) which opens toward the leg plate 16 as a whole. A solenoid 110 is provided radially outside the ratchet portion 106 (below the ratchet portion 106 in the present embodiment). The solenoid 110 is electrically connected to a battery loaded on a vehicle via an ECU serving as a control means. Moreover, the ECU is electrically connected to a buckle switch provided at a buckle device which constitutes a seat belt device along with the webbing take-up device 10. When the buckle switch detects that a tongue plate provided at the above webbing belt 20 is mounted on the buckle device, the ECU brings the solenoid 110 into an energized state. When the solenoid 110 is brought into an energized state in this way, the solenoid 110 forms a magnetic field.

Additionally, the solenoid 110 is provided with a plunger 112. The plunger 112 is formed in the shape of a rod from a magnetic body, and its longitudinal base end enters the solenoid 110. When the solenoid 110 is energized as described above, the plunger 112 is further drawn into the inside of the solenoid 110 by the magnetic field which the solenoid 110 forms. A pawl 114 is provided on the tip side of the plunger 112. The pawl 114 includes a cylindrical portion 116. The axial direction of the cylindrical portion 116 becomes the same direction as the axial direction of the spool 18. A shaft portion 118 (refer to FIG. 2) of which at least one end is held by at least any one of the sheet 62 and the case 24 passes through the cylindrical portion 116, and the pawl 114 is rotatably supported around the shaft portion 118. A rotation regulating piece 120 extends from a portion of the outer periphery of the cylindrical portion 116.

Figure 3:
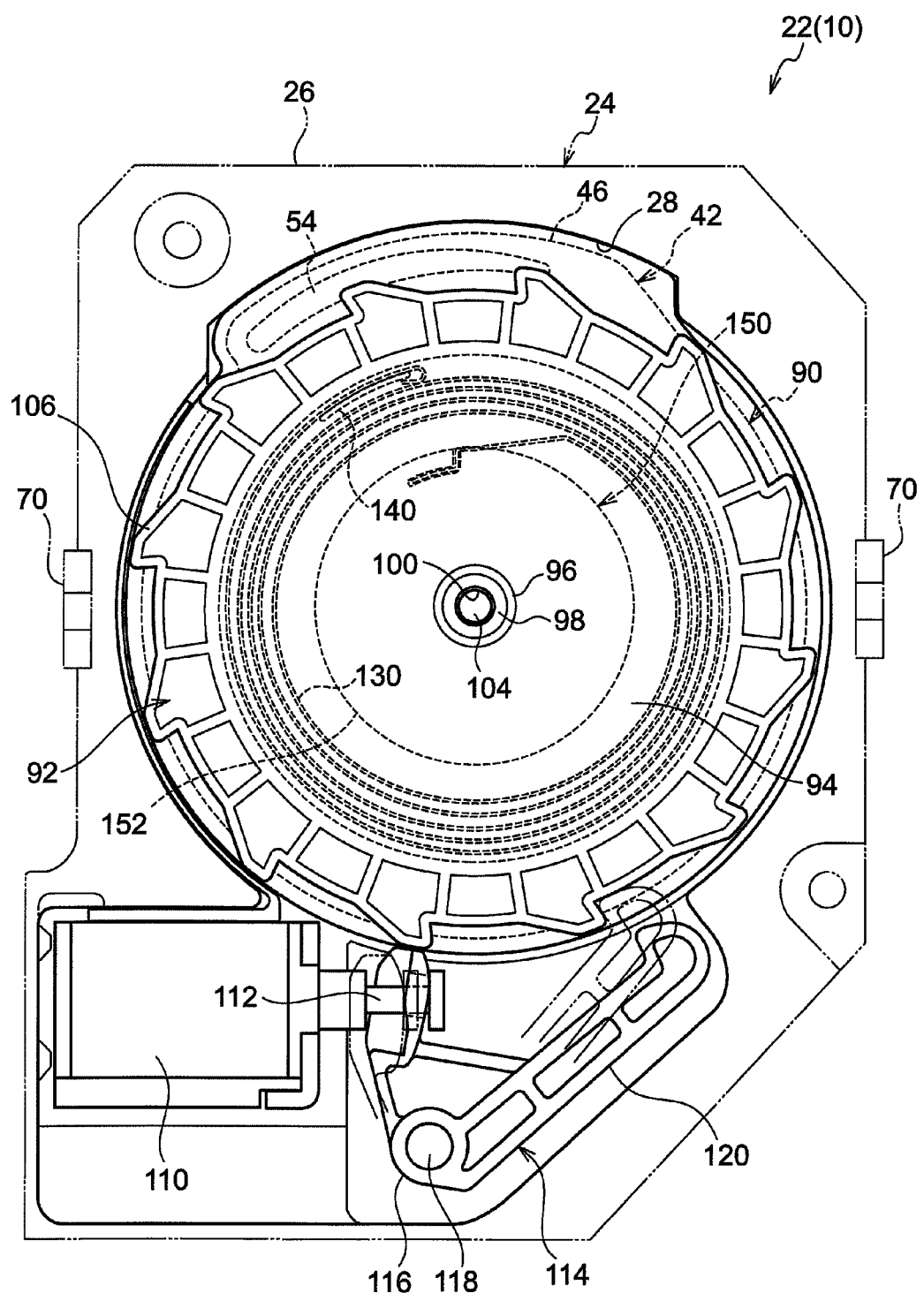
FIG. 3 is a side view showing a rotating body and a mechanism which regulates the rotation of the rotating body in a take-up direction, which constitute the webbing take-up device related to one embodiment of the invention.

When the pawl 114 turns in an engaging direction which is one side around the shaft portion 118 as shown in FIG. 3, the tip of the rotation regulating piece 120 approaches the outer peripheral portion of the ratchet portion 106 and engages with the ratchet gear teeth of the ratchet portion 106. In a state in which the tip of the rotation regulating piece 120 has engaged with the ratchet gear teeth of the ratchet portion 106, the rotation of the ratchet gear 92 in the take-up direction is regulated. Additionally, a connecting piece 122 extends from a portion of the outer periphery of the cylindrical portion 116. The pawl 114 is connected to the plunger 112 by the connecting piece 122. When the plunger 112 is drawn into the solenoid 110, the connecting piece 122 is pulled by the plunger 112 and the pawl 114 turns in the engaging direction around the shaft portion 118. Additionally, one end of a return spring 124 is locked to the pawl 114, and the pawl 114 is biased in a direction opposite to the engaging direction. When the solenoid 110 is not energized, the tip side of the rotation regulating piece 120 is maintained in the state of being separated from the outer peripheral portion of the ratchet portion 106.

Meanwhile, a reduction balance spring 130 serving as an offset biasing member which constitutes the reduction spring unit 90 is arranged inside the ratchet gear 92 (i.e., inside the ratchet portion 106 on the leg plate 16 side of the bottom wall portion 94). The reduction balance spring 130 is constituted by a power spring which has a biasing force weaker than the take-up spring 50 and in which the direction to the inside in the spiral direction from the outside in the spiral direction becomes the take-up direction.

Figure 4:
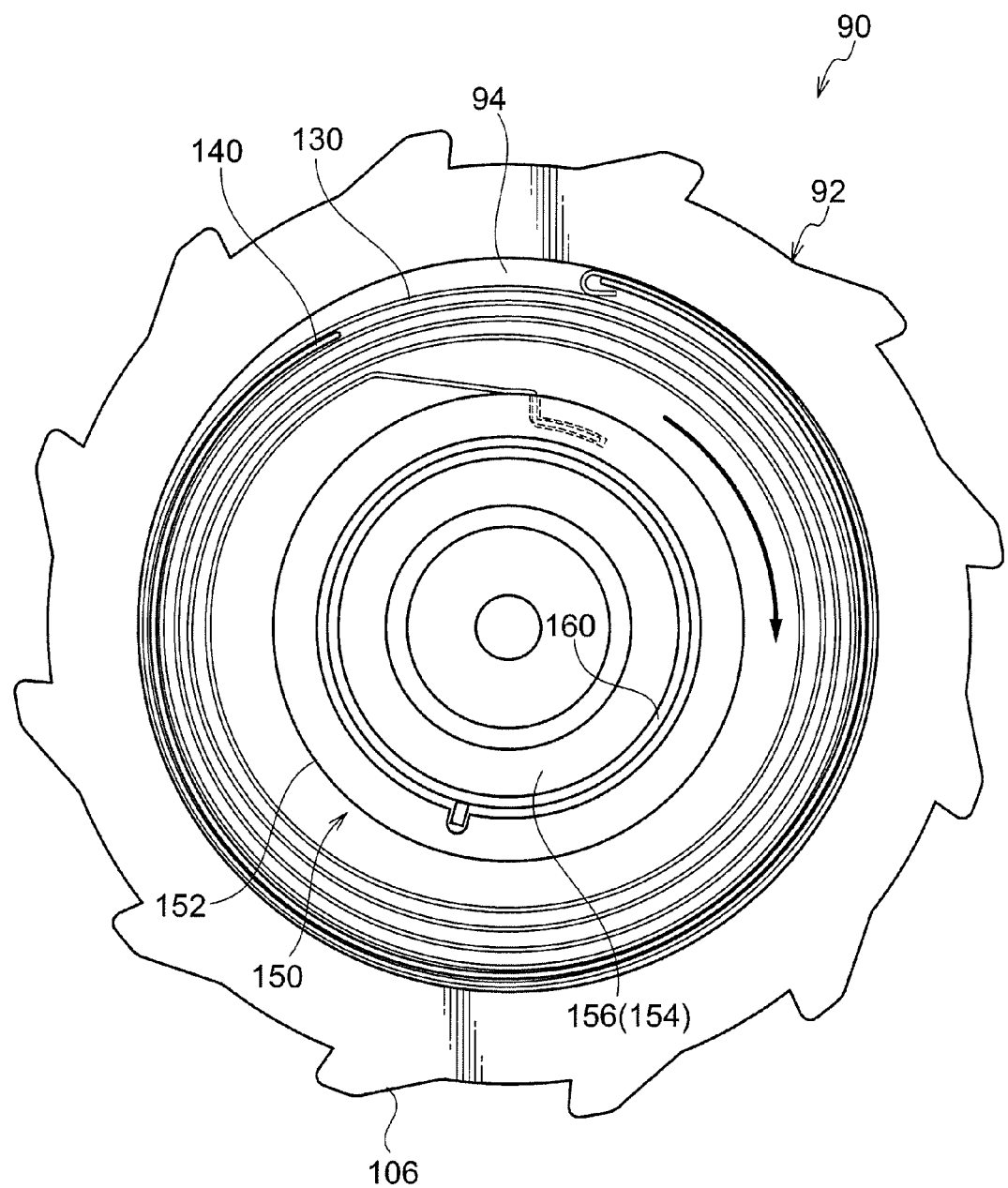
FIG. 4 is a side view of the rotating body as seen from the side opposite to FIG. 3.

As shown in FIGS. 3 and 4, the reduction balance spring 130 is bent inward in the radial direction and inward in the spiral direction near its outer end in the spiral direction. A reduction sliding spring 140 is arranged between a portion (outermost portion of a spiral) of an outermost layer of the reduction balance spring 130 in the spiral direction, and a second portion (second portion from the outside of the spiral) from the outermost layer. The reduction sliding spring 140 is formed in the shape of a narrow plate of which the longitudinal direction runs along the circumferential direction of the reduction balance spring 130 and the width direction runs along the axial direction of the spool 18. The reduction sliding spring 140 is bent around an axis having the width direction as its axial direction with the inner end of the reduction balance spring 130 in the spiral direction as a center of curvature.

Moreover, as shown in FIGS. 2 to 4, a clutch 150 which constitutes a rotation transmission member serving as a rotation transmission member is provided further inside a portion (innermost portion of the spiral) of an innermost layer of the reduction balance spring 130 in the spiral direction. The clutch 150 includes a spring case 152. The spring case 152 is formed in the shape of a bottomed cylinder which opens toward the leg plate 16. The spring case 152 is supported by the portion, which is located closer to the leg plate 16 side than the bottom wall portion 94, in the boss 96 formed in the bottom wall portion 94 of the ratchet gear 92 so as to be relatively rotatable coaxially with the ratchet gear 92.

The shaft portion 104 of the adapter 56 passes through the bottom wall of the spring case 152, and is supported by the shaft portion 104 so as to be relatively rotatable coaxially with the shaft portion 104. As shown in FIGS. 3 and 4, the inner end of the reduction balance spring 130 in the spiral direction is locked to the spring case 152.

Additionally, the clutch 150 includes a clutch wheel 154 as shown in FIG. 1. The clutch wheel 154 includes a cylindrical clutch wall 156, the clutch wall 156 enters the inside of the spring case 152 in the state of being coaxial with the bearing 102, and the clutch wheel 154 is assembled to the spring case 152 in this state. Additionally, a non-circular rotation-stop portion 158 interposed between a main body portion of the adapter 56 and the bearing 102 passes through the clutch wheel 154, and regulates the relative rotation of the clutch wheel 154 to the adapter 56.

A clutch spring 160 is arranged inside the above spring case 152 and outside the clutch wall 156. The clutch spring 160 is formed in the shape of a coil of which the axial direction becomes the same direction as the axial direction of the spool 18, and an end of the clutch spring is locked to the spring case 152. In a case where the clutch spring 160 is regarded to have a cylindrical shape, its internal diameter dimension is almost equal to the external diameter dimension of the clutch wall 156, and the clutch spring 160 comes into sliding contact with the outer peripheral portion of the clutch wall 156. Moreover, the winding direction of a coil is set so as to be wound and tightened due to another end of the clutch spring 160 displaced in the take-up direction with respect to the one end of the clutch spring.

Working and Effects of Present Embodiment

Next, working and effects of the present embodiment will be described.

(Operation of Tension Reducer 22)

In the webbing take-up device 10, when an occupant who has sat down on a seat of a vehicle pulls the webbing belt 20 toward its tip to pull the webbing belt 20 out from the spool 18 in order to wear the webbing belt 20 on his/her body, the spool 18 rotates in the pull-out direction. When the spool 18 rotates in the pull-out direction, the adapter 56 rotates in the pull-out direction to rotate the inner end, in the spiral direction, of the take-up spring 50 in the pull-out direction with respect to the outer end of the take-up spring 50 in the spiral direction. Thereby, the take-up spring 50 is wound and tightened, and the biasing force which biases the spool 18 in the take-up direction via the adapter 56 increases gradually.

Additionally, as the adapter 56 rotates in the pull-out direction in this way, the clutch wheel 154 rotates in the pull-out direction. Since the clutch spring 160 comes into sliding contact with the outer peripheral portion of the clutch wall 156 of the clutch wheel 154, when the clutch spring 160 rotates in the pull-out direction along with the clutch wall 156 due to the friction between the outer peripheral portion of the clutch wall 156, and the clutch spring 160, the spring case 152 to which one end of the clutch spring 160 is locked rotates in the pull-out direction.

Since the inner end of the reduction balance spring 130 in the spiral direction is locked to the spring case 152, when the spring case 152 rotates in the pull-out direction, the inner end of the reduction balance spring 130 in the spiral direction rotates in the pull-out direction. Since the outermost layer of the reduction balance spring 130 is brought into pressure contact with the ratchet portion 106 of the ratchet gear 92 by the elasticity of the reduction balance spring 130 and the elasticity of the reduction sliding spring 140, when the inner end of the reduction balance spring 130 in the spiral direction rotates in the pull-out direction, the outermost layer of the reduction balance spring 130 rotates in the pull-out direction, and the ratchet gear 92 rotates in the pull-out direction due to the friction between the outermost layer of the reduction balance spring 130 and the inner peripheral portion of the ratchet portion 106. That is, in this state, even if the rotational force of the spool 18 in the pull-out direction is transmitted to the ratchet gear 92, the ratchet gear 92 only rotates in the pull-out direction, and a change is not particularly generated in the reduction balance spring 130.

Next, when the webbing belt 20 is pulled out enough and is hung around the occupant's body, and the tongue provided at the webbing belt 20 is mounted on the buckle device, the ECU brings the solenoid 110 into an energized state on the basis of an electrical signal from the buckle switch provided at the buckle device. When the plunger 112 is drawn into the solenoid 110 by the magnetic field formed as the solenoid 110 is energized, the pawl 114 in which the connecting piece 122 engages with the tip of the plunger 112 turns in the engaging direction against the biasing force of the return spring 124. Thereby, when the rotation regulating piece 120 of the pawl 114 engages with the ratchet gear teeth formed on the outer peripheral portion of the ratchet portion 106, the rotation of the ratchet gear 92 in the take-up direction is regulated.

In this state, when the occupant ends the pulling force applied to the webbing belt 20 in order to pull out the webbing belt 20 (when the occupant stops the pulling of the webbing belt 20), the take-up spring 50 rotates the spool 18 in the take-up direction via the adapter 56 by its biasing force, thereby removing the slack from the webbing belt 20. When the clutch wheel 154 rotates in the take-up direction as the adapter 56 is rotated in the take-up direction, the other end of the clutch spring 160 rotates in the take-up direction due to the friction with the clutch wall 156, and thereby, the clutch spring 160 is wound and tightened.

When the friction between the clutch spring 160 and the clutch wall 156 increases as the clutch spring 160 is wound and tightened, the whole clutch spring 160 rotates in the take-up direction along with the clutch wall 156 (i.e., the clutch wheel 154). When the spring case 152 rotates in the take-up direction as the clutch spring 160 rotates in the take-up direction, the inner end of the reduction balance spring 130 in the spiral direction locked to the spring case 152 rotates in the take-up direction.

Since the outermost layer of the reduction balance spring 130 is brought into pressure contact with the ratchet portion 106 of the reduction spring unit 90 by the elasticity of the reduction balance spring 130 and the elasticity of the reduction sliding spring 140, and the rotation of a ratchet gear 92 in the take-up direction is regulated as described above, even if the inner end of the reduction balance spring 130 in the spiral direction rotates in the take-up direction in this state, the outermost layer of the reduction balance spring 130 does not rotate due to the friction with the inner peripheral portion of the ratchet portion 106, or has a rotational amount smaller than the inner end in the spiral direction. As for the reduction balance spring 130, the direction to the inside in the spiral direction from the outside in the spiral direction becomes the take-up direction. For this reason, when the inner end of the reduction balance spring 130 in the spiral direction rotates in the take-up direction relatively to the outer end in the spiral direction, the reduction balance spring 130 is wound and tightened, and thereby, the biasing force to rotate the inner end in the spiral direction in the pull-out direction increases.

The biasing force of the reduction balance spring 130 which is generated (increased) in this way resists the force to rotate the spring case 152 to which the inner end of the reduction balance spring 130 in the spiral direction is locked in the take-up direction, i.e., the biasing force of the take-up spring 50.

Moreover, when the reduction balance spring 130 is wound and tightened until the reduction balance spring perfectly comes into close contact with the outer peripheral portion of the spring case 152, the outermost layer of the reduction balance spring 130 and the reduction sliding spring 140 are integrally rotated by a rotational force in the take-up direction which is transmitted to the reduction balance spring 130 via the spring case 152 after this state.

As some or all of biasing force of the take-up spring 50 is offset by the biasing force of the reduction balance spring 130 in this way, the force to rotate the spool 18 in the take-up direction decreases, and the force to pull the webbing belt 20 worn on the occupant's body to its tip decreases. This reduces the force (static fastening force) that the webbing belt 20 applies to the occupant.

Additionally, when the body of the occupant wearing the webbing belt 20 moves, the webbing belt 20 is pulled out. When the spool 18 rotates in the pull-out direction as the webbing belt 20 is pulled out, the take-up spring 50 is wound and tightened, and the force which biases the spool 18 in the take-up direction, and thus the force to pull the webbing belt 20 to fasten the occupant's body increases. However, in the webbing take-up device 10, the biasing force of the reduction balance spring 130 offsets the biasing force of the take-up spring 50. Thus, an increase in the fastening force (dynamic fastening force) of the webbing belt 20 when the occupant's body moves and pulls the webbing belt 20 can be suppressed.

(Function of Bearing 102 of Case 24)

Meanwhile, when the rotation regulating piece 120 of the pawl 114 engages with the ratchet gear teeth of the ratchet portion 106 to regulate the rotation of the ratchet gear 92 in the take-up direction as described above, the ratchet gear 92 receives the pressing force from the rotation regulating piece 120, and the ratchet gear 92 attempts to be displaced in its radial direction as a whole. However, the ratchet gear 92 is supported by the bearing 102 as the bearing 102 formed at the case 24 enters the inside of the boss 96 (i.e., the ratchet gear 92 is supported by the outer peripheral portion of the bearing 102). On the other hand, the shaft portion 104 of the adapter 56 enters the inside of the bearing 102 and is thereby supported by the bearing 102 (i.e., the shaft portion 104 of the adapter 56 is supported by the inner peripheral portion of the bearing 102).

That is, the boss 96 of the ratchet gear 92 and the shaft portion 104 of the adapter 56 are independently supported by the bearing 102, respectively. For this reason, even if the ratchet gear 92 attempts to be displaced in its radial direction as a whole as the rotation regulating piece 120 of the pawl 114 engages with the ratchet gear teeth of the ratchet portion 106, the adapter 56 is not influenced (resistance) or there is little influence by which the ratchet gear 92 attempts to be displaced in its radial direction as a whole.

Accordingly, even in a state in which the rotation regulating piece 120 engages with the ratchet teeth to regulate the rotation of the ratchet gear 92 in the take-up direction, the adapter 56 can be smoothly rotated.

(Function of Clutch 150)

Meanwhile, for example, if an occupant operates the buckle device to remove a tongue plate from the buckle device such as when the occupant removes the webbing belt 20 worn on his/her body, the ECU interrupts energization to the solenoid 110 by an electrical signal from the buckle switch. When the magnetic field formed by the solenoid 110 as the energization to the solenoid 110 is interrupted is eliminated, the pawl 114 is turned in the direction opposite to the engaging direction by the biasing force of the return spring 124, and the engagement between the rotation regulating piece 120 and the ratchet gear teeth of the ratchet portion 106 is eliminated.

As described above, in a state in which the rotation of a ratchet gear 92 in the take-up direction is regulated, the inner end of the reduction balance spring 130 in the spiral direction rotates in the take-up direction relative to the outer end in the spiral direction, and the biasing force increases. For this reason, when the rotation regulation of the ratchet gear 92 is eliminated, the outermost layer of the reduction balance spring 130 brought into pressure contact with the inner peripheral portion of the ratchet portion 106 by the biasing force of the reduction balance spring 130 rotates the ratchet gear 92 in the take-up direction. When the biasing force of the reduction balance spring 130 is released, and the spring case 152 rotates further in the take-up direction due to the momentum with which the ratchet gear 92 rotates in the take-up direction, loosening of the clutch spring 160 wound and tightened to the outer peripheral portion of the clutch wall 156 until this time occurs.

Thereby, the clutch spring 160 to which the rotational force of the ratchet gear 92 has been transmitted via the spring cases 152 and the reduction balance spring 130 rotates in the take-up direction so as to slide on the clutch wall 156. For this reason, the rotational force of the ratchet gear 92 in the take-up direction does not act on the inner end of the reduction balance spring 130 in the spiral direction and a portion in the vicinity of the inner end in a concentrated manner. For this reason, a supporting member (for example, a supporting member disclosed in Japanese Patent Application Laid-Open (JP-A) No. 2003-19946) for preventing buckling of the inner end of the reduction balance spring 130 in the spiral direction and a portion in the vicinity of the inner end, which results from such a rotational force, becomes unnecessary.

Since such a supporting member becomes unnecessary, the biasing force of the reduction balance spring 130 can be transmitted directly to the spring case 152, and the transmission efficiency of the biasing force improves. Moreover, since it is not necessary to provide the supporting member inside the ratchet gear 92, the space efficiency inside the ratchet gear 92 can be improved, and the comparatively large-sized reduction balance spring 130 can be used without, for example, miniaturizing the ratchet gear 92 or enlarging the ratchet gear 92.

(Working and Effects of Present Embodiment Seen from Attachment Surface)

Next, the working and effects of the present embodiment seen from the attachment surface of the tension reducer 22 will be described through the description of an assembling process of the tension reducer 22.

When the tension reducer 22 is assembled in the present webbing take-up device 10, first, the take-up spring unit 40, the reduction spring unit 90, and the clutch 150 are respectively assembled.

In the assembling process of the take-up spring unit 40, the take-up spring 50 is arranged inside the spring cover 42 and the locking portion 52 is locked to the locking wall 54 and configured as a unit. On the other hand, in the assembling process of the reduction spring unit 90, the reduction balance spring 130 and the reduction sliding spring 140 are arranged inside the ratchet gear 92, and thereby, the ratchet gear 92, the reduction balance spring 130, and the reduction sliding spring 140 are configured as a unit. Moreover, in the assembling process of the clutch 150, the clutch wall 156 of the clutch wheel 154 is inserted into the inside of a coil portion of the clutch spring 160. In this state, one end of the clutch spring 160 is locked to the spring case 152, and thereby, the clutch 150 is assembled.

Next, the reduction spring unit 90 assembled as described above, as shown in Step (1) in FIG. 5, is first arranged within the reduction spring unit housing portion 88 in the case 24, and the ratchet gear 92 is supported by the bearing 102. Next, as shown in Step (2) in FIG. 5, the clutch 150 is arranged inside the reduction balance spring 130, and the inner end of the reduction balance spring 130 in the spiral direction is locked to the spring case 152. Here, in this state, the clutch 150 and the reduction balance spring 130 can be easily and visually recognized from the opening side of the case 24. Thus, the other end of the reduction balance spring 130 can be easily locked to the spring case 152.

Figure 5:
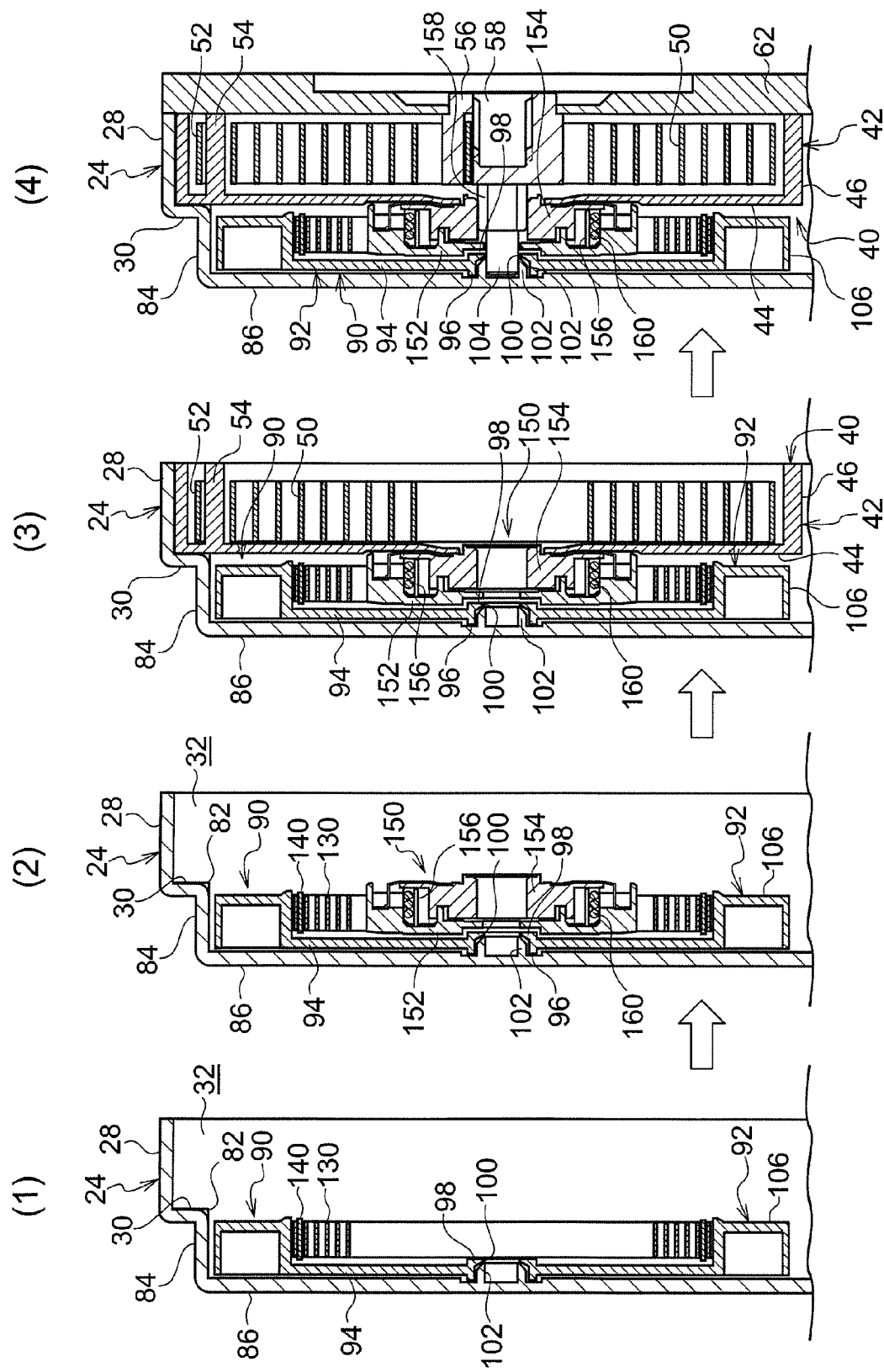
FIG. 5 is a view showing an assembling process of a tension reducer.

Next, as shown in Step (3) in FIG. 5, the spring cover 42 of the take-up spring unit 40 is fitted into the take-up spring unit housing portion 32 of the case 24. Here, since the spring case 152 of the clutch 150 is rotatably supported by the boss 96, the clutch 150 is located at the center of the ratchet gear 92. Thereby, even if the spring cover 42 is mounted on the take-up spring unit housing portion 32 of the case 24, the hole of the clutch wall 156 into which the rotation-stop portion 158 fits can be visually seen through a through hole of the bottom wall 44 (spring cover 42) through which the bearing 102 and the rotation-stop portion 158 pass.

As shown in Step (4) in FIG. 5, the adapter 56 is arranged inside the take-up spring 50 in a state in which the take-up spring unit 40 is mounted on the case 24, and the rotation-stop portion 158 or shaft portion 104 of the adapter 56 are made to pass through the clutch 150 and the ratchet gear 92. As described above, however, even if the spring cover 42 is mounted on the take-up spring unit housing portion 32, the hole of the clutch wall 156 into which the rotation-stop portion 158 fits can be visually seen through the through hole of the bottom wall 44 (spring cover 42) through which the bearing 102 and the rotation-stop portion 158 pass. Thus, the rotation-stop portion 158 can be easily fitted into the clutch wheel 154, and the shaft portion 104 can be easily fitted and inserted into the bearing 102.

What is claimed is:

1. A webbing take-up device comprising:
   a spool having a longitudinal base end of a long belt-shaped webbing belt locked thereto, taking up the webbing belt from the base end, and rotating in a pull-out direction as the webbing belt is pulled out;
   a bottomed case provided at an axial direction side of the spool and opening toward the spool;
   a spool biasing member formed by a first single spiral spring wound in a first direction provided inside the case on one side of the spool and connected directly or indirectly to the spool so as to generate a take-up biasing force to the spool in a take-up direction opposite to the pull-out direction as the spool rotates in the pull-out direction;
   a rotating body arranged within the case on the opposite side of the spool biasing member from the spool and rotatable in the pull-out direction and the take-up direction;
   an offset biasing member formed by a second spiral spring wound in a direction that is opposite from that of the first single spiral spring and arranged within the case on the opposite side of the spool biasing member from the spool along with the rotating body such that the spool biasing member is sandwiched between the offset biasing member and said side of the spool, one end of the offset biasing member engaging with the rotating body so as to be rotatable along with the rotating body, and the offset biasing member producing a biasing force which resists, but which is weaker than, the take-up biasing force of the spool biasing member due to another end of the offset biasing member rotating in the take-up direction with respect to the one end of the offset biasing member; and
   a rotation transmission member connected to the spool biasing member, and provided so as to be rotatable in the take-up direction by the take-up biasing force of the spool biasing member, the other end of the offset biasing member locked to the rotation transmission member such that the rotation in the take-up direction can be transmitted to the other end of the offset biasing member.

2. The webbing take-up device according to claim 1, wherein the offset biasing member is configured to be arranged inside the rotating body, the rotating body is configured to be attached to the case in a state in which the offset biasing member is arranged inside the rotating body and the rotating body and the offset biasing member are configured as a unit, the spool biasing member is held by a holding body that holds the spool biasing member and is configured as a unit therewith, and the holding body is configured to be attached to the case in a state in which the spool biasing member is held by the holding body.

* * * * *